US010956778B2

(12) United States Patent
Ratha et al.

(10) Patent No.: US 10,956,778 B2
(45) Date of Patent: Mar. 23, 2021

(54) MULTI-LEVEL DEEP FEATURE AND MULTI-MATCHER FUSION FOR IMPROVED IMAGE RECOGNITION

(71) Applicant: International Business Machines Corporation, Armonk, NY (US)

(72) Inventors: Nalini K. Ratha, Yorktown Heights, NY (US); Gaurav Goswami, Bengaluru (IN); Sharathchandra U. Pankanti, Darien, CT (US)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 16/292,963

(22) Filed: Mar. 5, 2019

(65) Prior Publication Data

US 2020/0285914 A1    Sep. 10, 2020

(51) Int. Cl.
| | | |
|---|---|---|
| *G06K 9/62* | (2006.01) | |
| *G06K 9/64* | (2006.01) | |
| *G06F 16/55* | (2019.01) | |

(52) U.S. Cl.
CPC ........... *G06K 9/6215* (2013.01); *G06F 16/55* (2019.01); *G06K 9/6228* (2013.01); *G06K 9/64* (2013.01)

(58) Field of Classification Search
None
See application file for complete search history.

(56) References Cited

U.S. PATENT DOCUMENTS

| | | | |
|---|---|---|---|
| 7,277,891 | B2 | 10/2007 | Howard et al. |
| 7,356,168 | B2 | 4/2008 | Tavares |
| 7,747,044 | B2 | 6/2010 | Baker et al. |
| 8,463,006 | B2 | 6/2013 | Prokoski |
| 8,494,227 | B2 | 7/2013 | Prokoski |
| 2011/0106734 | A1 | 5/2011 | Boult et al. |

(Continued)

FOREIGN PATENT DOCUMENTS

| | | |
|---|---|---|
| CN | 107066941 A | 3/2017 |
| CN | 107578007 A | 1/2018 |
| CN | 111666965 A | 9/2020 |

OTHER PUBLICATIONS

Disclosed Anonymously "System and Method of Multi-person 3D Multi-angle Fast Face Recognition"; An IP.com Prior Art Database Technical Disclosure; Electronic Publication Date: Jan. 19, 2011; IP.com No. IPCOM000203089D; pp. 23.

(Continued)

*Primary Examiner* — Justin P. Misleh
(74) *Attorney, Agent, or Firm* — Samuel Waldbaum

(57) ABSTRACT

A system, method and program product for implementing image recognition. A system is disclosed that includes a training system for generating a multi-feature multi-matcher fusion (MMF) predictor for scoring pairs of images, the training system having: a neural network configurable to extract a set of feature spaces at different resolutions based on a training dataset; and an optimizer that processes the training dataset, extracted feature spaces and a set of matcher functions to generate the MMF predictor having a series of weighted feature/matcher components; and a prediction system that utilizes the MMF predictor to generate a prediction score indicative of a match for a pair of images.

20 Claims, 4 Drawing Sheets

(56) References Cited

U.S. PATENT DOCUMENTS

| | | | |
|---|---|---|---|
| 2015/0052139 A1* | 2/2015 | Cevahir | G06F 16/285 |
| | | | 707/737 |
| 2020/0160154 A1* | 5/2020 | Taslakian | G06N 3/0427 |
| 2020/0250226 A1* | 8/2020 | Yang | G06K 9/6256 |
| 2020/0272902 A1* | 8/2020 | Feng | G06K 9/00 |

OTHER PUBLICATIONS

Disclosed Anonymously; "System and Apparatus of Multi-person Screening Sharing Based on 3D Multi-person Multi-angle Fast Face Recognition Algorithm"; An IP.com Prior Art Database Technical Disclosure; Electronic Publication Date: Jan. 26, 2011; IP.com No. IPCOM000203470D; pp. 34.

Disclosed Anonymously; "The system and method for security enhancement of face recognition"; An IP.com Prior Art Database Technical Disclosure; Electronic Publication Date: May 26, 2018; IP.com No. IPCOM000254038D; pp. 6.

Disclosed Anonymously; "Face Recognition for Access Control with Visual PIN"; An IP.com Prior Art Database Technical Disclosure; Electronic Publication Date: Jul. 6, 2018; Copyright: Honeywell International Inc.; IP.com No. IPCOM000254503D; pp. 5.

Lu, Xiaojun et al.; "Face Verification with Multi-Task and Multi-Scale Feature Fusion"; entropy 2017; 19, 228; Published May 17, 2017; pp. 15; <www.mdpi.com/journal/entropy>.

Xiong, Lu et al.; "A Good Practice Towards Top Performance of Face Recognition: Transferred Deep Feature Fusion"; IEEE Transactions on XXXX; vol. XX; No. XX; 201X; pp. 13.

Xu, Lu et al.; "Transferring Rich Deep Features for Facial Beauty Prediction"; Mar. 20, 2018; pp. 6.

Schroff, Florian et al.; "FaceNet: A Unified Embedding for Face Recognition and Clustering"; Proceedings of the IEEE Conference on Computer Vision and Pattern Recognition; Jun. 17, 2015; pp. 10.

Parkhi, Omkar M. et al.; "Deep Face Recognition"; Visual Geometry Group; Department of Engineering Science University of Oxford; Copyright 2015; pp. 12.

Taigman, Yaniv et al.; "DeepFace: Closing the Gap to Human-Level Performance in Face Verification"; Conference on Computer Vision and Pattern Recognition; pp. 8.

Ross, Arun et al.; "Feature Level Fusion Using Hand and Face Biometrics"; Appeared in Proc. of SPIE Conference on Biometric Technology for Human Idenfication II; vol. 5779; pp. 196-204; Orlando USA; Mar. 2005.

Parveen, Pallabi et al.; "Face Recognition using Multiple Classifiers"; IEEE Computer Society; Proceedings of the 18th IEEE International Conference on Tools with Artificial Intelligence (ICTAI'06); Copyright 2006 IEEE; pp. 8.

\* cited by examiner

MULTI-LEVEL DEEP FEATURE AND MULTI-MATCHER FUSION FOR IMPROVED IMAGE RECOGNITION

TECHNICAL FIELD

The subject matter of this invention relates to image recognition and more particularly to a system and method of fusing multiple feature space levels and multiple matcher functions to improve image recognition.

BACKGROUND

Improving image recognition technologies, such as facial recognition accuracy, remains an ongoing challenge. Deep learning neural networks (DNN) are a leading technology used in such applications, and are particularly effective when dealing with high quality images. DNNs generally work by training the neural network with training data to determine an optimal set of weights in order to extract features that can be used to compare subject matter with a pair of images. A typical set of measurable properties or "feature space" consists of a fixed number of dimensions, e.g., 256.

Once trained, individual images can be passed through a neural network to generate a set of measurement values (i.e., a feature vector) as defined by the feature space. To determine if a newly acquired image matches a stored image, the feature vectors of the two images are compared, e.g., using a matcher function such as a classification or a distance algorithm. However, as database searches become large and larger, higher accuracy is required. In addition, in more challenging situations, e.g., where the inputted image quality is bad due to low resolution, bad pose, bad illumination, etc., additional improvement in accuracy is required.

SUMMARY

Aspects of the disclosure provide a system and method of fusing multiple feature space levels and multiple matcher functions to improve image recognition.

A first aspect discloses an image recognition system, having: a training system for generating a multi-feature multi-matcher fusion (MMF) predictor for scoring pairs of images, the training system having: a neural network configurable to extract a set of feature spaces at different resolutions based on a training dataset; and an optimizer that processes the training dataset, extracted feature spaces and a set of matcher functions to generate the MMF predictor having a series of weighted feature/matcher components; and a prediction system that utilizes the MMF predictor to generate a prediction score indicative of a match for a pair of images.

A second aspect discloses a computer program product stored on a computer readable storage medium, which when executed by a computing system, provides image recognition, the program product including: program code for generating a multi-feature multi-matcher fusion (MMF) predictor for scoring pairs of images, and having: a neural network configurable to extract a set of feature spaces at different resolutions based on a training dataset; and an optimizer that processes the training dataset, extracted feature spaces and a set of matcher functions to generate the MMF predictor having a series of weighted feature/matcher components; and program code that utilizes the MMF predictor to generate a prediction score indicative of a match for a pair of images.

A third aspect discloses a computerized method of implementing image recognition, including: training a neural network on a training dataset; extracting from the neural network a set of feature spaces at different resolutions; selecting a set of matcher functions; generating a multi-feature multi-matcher fusion (MMF) predictor having a set of feature/matcher components, wherein the MMF predictor is configured to output a score for a pair of inputted images; and calculating a weight for each of the feature/matcher components based on the training dataset, extracted feature spaces and set of matcher functions.

BRIEF DESCRIPTION OF THE DRAWINGS

These and other features of this invention will be more readily understood from the following detailed description of the various aspects of the invention taken in conjunction with the accompanying drawings in which.

Figure 1:
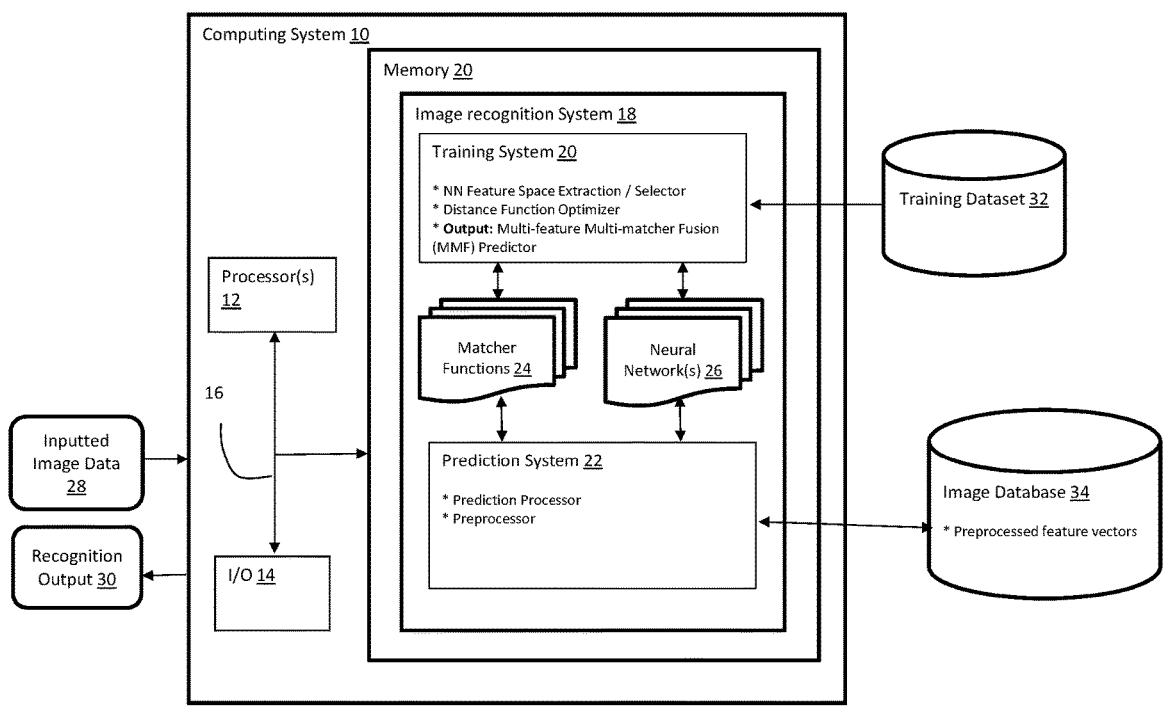
FIG. 1 shows a computing system having an image recognition system according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring now to the drawings, FIG. 1 depicts a computing system 10 having an image recognition system 18 that can, e.g., determine if an inputted image 28 matches one or more images in the image database 34, and generate a recognition output 30. For example, image recognition system 18 may comprise a facial recognition system in which the inputted image 28 comprises a detected face image in a video feed and the image database 34 includes processed facial images. Recognition output 30 may indicate whether a facial match was detected, an identification of the recognized image, etc.

Image recognition system 18 generally includes: (1) a training system 20 that uses a training dataset 32, a set of matcher functions 24, and one or more neural networks 26 to generate a multi-matcher multi-distance fusion (MMF) predictor; and (2) a prediction system 22 that uses the MMF predictor, neural network(s) 26 and the set of matcher functions 24 to compare the inputted image 28 with images stored in the image database 34. Any type of matcher function 24 may be utilized, e.g., cosine, chi-square, Euclidian, correlation distance, etc., and the number and type of matcher functions 24 may be selected in any manner, e.g., based on experience of the designer, machine learning, etc.

Figure 2:
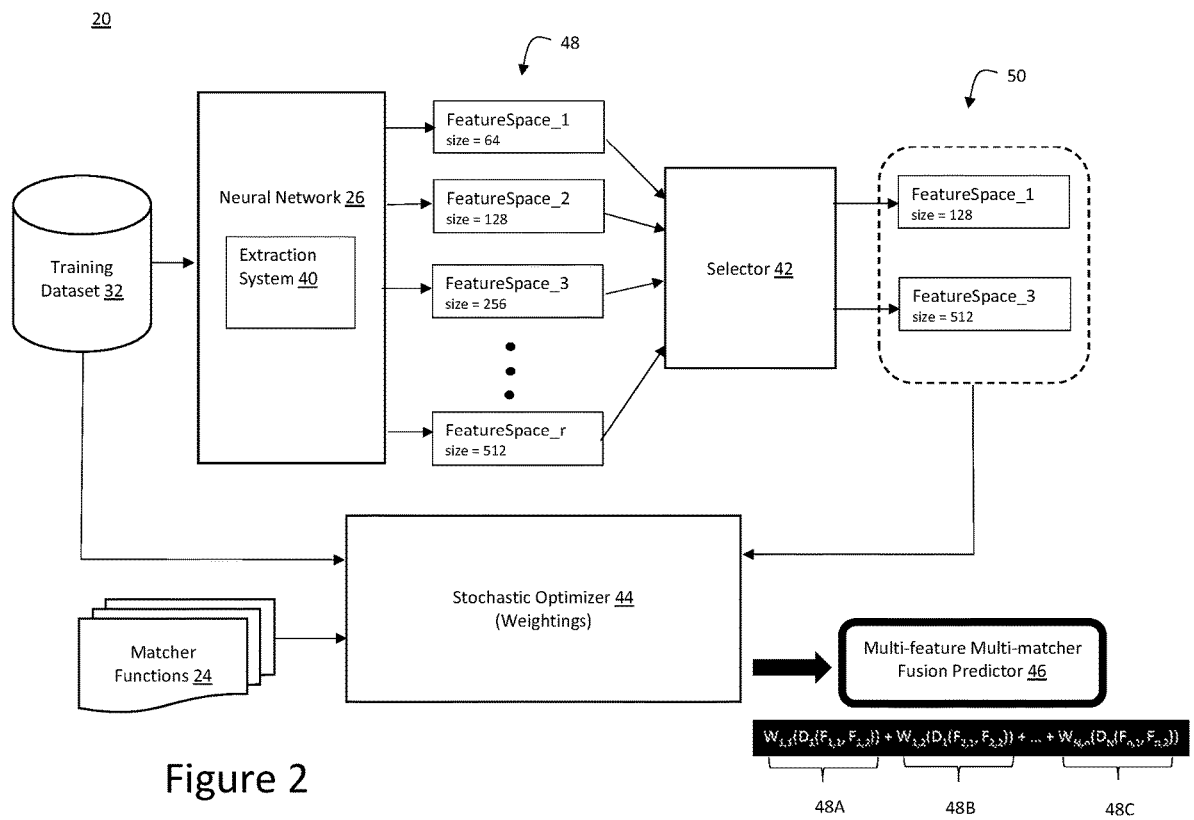
FIG. 2 shows a training system according to embodiments.

FIG. 2 depicts an illustrative embodiment of the training system 20 in which a single neural network 26 is trained with training dataset 32 to extract a set of feature spaces 48 at different resolutions. Accordingly, rather than computing just a single final feature space, e.g., size=512, an extraction system 40 is employed to extract multiple feature spaces (e.g., size=64, 128, 256, etc.) from the neural network 26. Each resolution thus comprises a different number and type of measurable properties that can be used to represent images for recognition purposes. Once generated, a selector 42 may be employed to select a set of representations 50 made up of a subset of the extracted feature spaces 48. The selector 42 may use any process for selecting the set of representations 50, e.g., machine learning, a scoring algorithm, an optimizer, etc.

Once the final set of representations 50 are selected, they are processed (along with the set of matcher functions 24 and training dataset 32) by a stochastic optimizer 44 to formulate the MMF predictor 46. In one illustrative embodiment, the MMF predictor 46 comprises a series the weighted "feature/matcher" components 48A, 48B, 48C that include some or all possible combinations of the matcher functions 24 and representations 50. Thus, if there are P representations 50 and Q matcher functions 24, the MMF predictor 46 would include P×Q weighted feature/matcher components.

Note that the selector 42 may be incorporated into the optimizer 44 such that the selection of representations 50 and calculation of weights for the MMF predictor 46 are determined together in one integrated process.

The resulting MMF predictor 46 is configured to score two inputted images using the following general format:

$$\text{Score} = W_{1,1}(D_1(F1_1, F2_1)) + W_{1,2}(D_1(F1_2, F2_2)) + \ldots + W_{N,n}(D_N(F1_n, F2_n))$$

($F1_i$, $F2_j$) denotes values of the feature vectors for two inputted images in the $j^{th}$ feature space. $D_i$ denotes the $i^{th}$ matcher function used to calculate a matcher score between the two feature vectors. $W_{i,j}$ denotes a weight applied using the $i^{th}$ matcher function and the $j^{th}$ feature space. In the case where there are two representations 50 (i.e., feature spaces) and two matcher functions, the MMF predictor 46 would have four feature/matcher components of the following format:

$$\text{Score} = W_{1,1}(D_1(F1_1, F2_1)) + W_{1,2}(D_1(F1_2, F2_2)) + W_{2,1}(D_2(F1_1, F2_1)) + W_{2,2}(D_2(F1_2, F2_2))$$

The optimizer 44 is configured to learn which "feature/matcher" combinations will perform the best and weigh them accordingly. Each weight $W_{i,j}$ may be in the range of [0,1], enabling certain comparisons to contribute more than others in the final prediction score and allowing the possibility to disregard one or more feature/matcher components entirely. In an alternative embodiment, the weights may be binary, i.e., either a 1 or a 0. Optimizer 44 can utilize any optimization criterion including one that involves recognition performance, accuracy, cross entropy loss, etc., as per the requirement of the problem. Additionally, a randomized grid search and/or stochastic gradient descent may be utilized.

Figure 3:
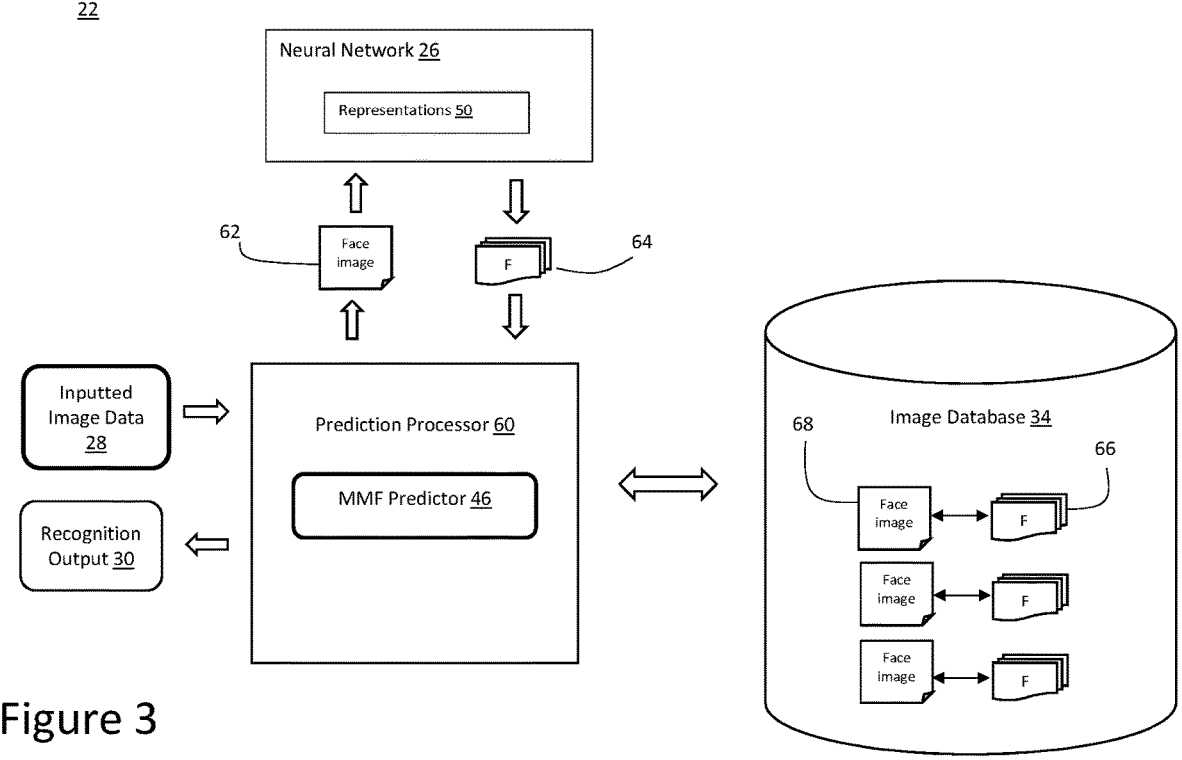
FIG. 3 shows a prediction system according to embodiments.

FIG. 3 depicts an illustrative embodiment of a prediction system 22 that processes inputted image data 28 (in this case a face image 62) and determines, e.g., if there is a match amongst any of the stored face images 68 in image database 34. In this example, a prediction processor 60 receives and forwards the face image 62 to the neural network 26, which then generates a set of feature vectors 64 based on the representations 50 (i.e., feature spaces) required by the MMF predictor 46. For example, the MMF predictor 46 may specify that feature spaces of size=512 and size=128 are required. In this case, two feature vectors 64 at those resolutions would be calculated for the face image 62 by the neural network 26.

Once the feature vectors 64 are obtained for the face image 62, they are plugged into the MMF predictor 46 along with the feature vectors 66 (of the same resolutions) for a stored image 68 and a prediction score is calculated. As detailed herein, the MMF predictor 46 will utilize a set of matcher functions 24 (FIG. 2) and defined weights to generate the predictions score. The process may be repeated for each image in the image database 34, or until a threshold prediction score is achieved. Recognition output 30 may comprise a matching image, scores, and/or any other prediction information. In this example, the feature vector 66 for the stored image 68 was previously calculated (preprocessed) by the neural network 26 and stored. However, the feature vector 66 for the stored image 68 could alternatively be calculated on as needed.

Figure 4:
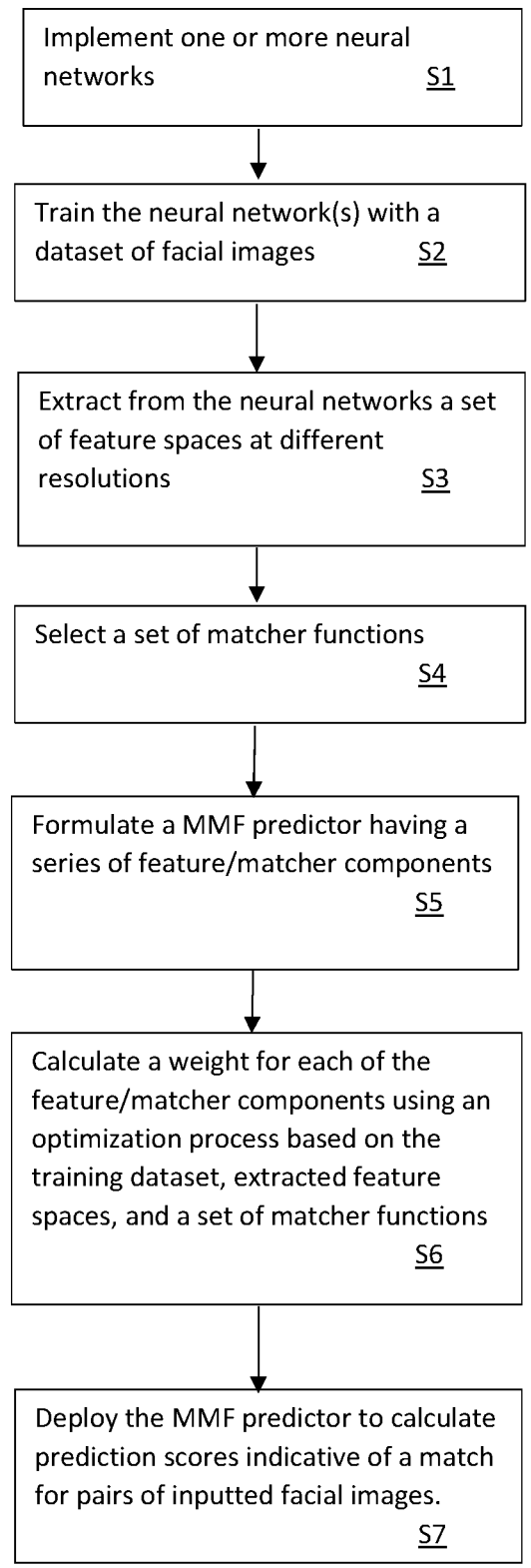
FIG. 4 shows a flow diagram of a facial recognition process according to embodiments.

FIG. 4 depicts a flow diagram of a facial recognition process. At S1, one or more neural networks 26 are implemented and at S2 the neural network(s) 26 are trained with a dataset of facial images. At S3, a set of feature spaces at different resolutions are extracted from the trained neural network 26. At S4, a set of matcher functions 24 are selected and at S5, an MMF predictor 46 is formulated with a series of feature/matcher components. At S6, a weight is calculated for each feature/matcher component using an optimization process based on a training dataset, extracted feature spaces and set of matcher functions 24. At S7, the MMF predictor 46 is deployed to calculate prediction scores indicative of a match for pairs of inputted facial images.

It is understood that image recognition system 18 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 10 (FIG. 1) may comprise any type of computing device and for example includes at least one processor 12, memory 20, an input/output (I/O) 14 (e.g., one or more I/O interfaces and/or devices), and a communications pathway 16. In general, processor(s) 12 execute program code which is at least partially fixed in memory 20. While executing program code, processor(s) 12 can process data, which can result in reading and/or writing transformed data from/to memory and/or I/O 14 for further processing. The pathway 16 provides a communications link between each of the components in computing system 10. I/O 14 can comprise one or more human I/O devices, which enable a user to interact with computing system 10. Computing system 10 may also be implemented in a distributed manner such that different components reside in different physical locations.

Furthermore, it is understood that image recognition system 18 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computer system, comprising:
   one or more computer processors, one or more computer-readable storage media, and program instructions stored on the one or more of the computer-readable storage media for execution by at least one of the one or more processors, the program instructions comprising:
   a training system for generating a multi-feature multi-matcher fusion (MMF) predictor for scoring pairs of images, the training system having:

a neural network configurable to extract a set of feature spaces at different resolutions based on a training dataset; and an optimizer that processes the training dataset, extracted feature spaces and a set of matcher functions to generate the MMF predictor having a series of weighted feature/matcher components; and a prediction system that utilizes the MMF predictor to generate a prediction score indicative of a match for a pair of images.

2. The image recognition system of claim 1, wherein the matcher functions are implemented using one of: cosine, chi-square, Euclidian, and correlation distance metrics.

3. The image recognition system of claim 1, wherein the different resolutions for the feature spaces include sizes of 128, 256, 518 and 1024.

4. The image recognition system of claim 1, wherein the weighted feature/matcher components of the MMF predictor have weights ranging between 0 and 1.

5. The image recognition system of claim 1, wherein the prediction system utilizes the neural network to generate different feature vectors corresponding to the selected feature spaces for an inputted image.

6. The image recognition system of claim 5, wherein the different feature vectors along with a second set of feature vectors associated with a stored image are utilized by the MMF predictor.

7. The image recognition system of claim 1, wherein the MMF predictor is of the form:

$$\text{Score} = W_{1,1}(D_1(F1_1, F2_1)) + W_{1,2}(D_1(F1_2, F2_2)) + \ldots + W_{N,n}(D_N(F1_n, F2_n)),$$

wherein $(F1_j, F2_j)$ denotes values of the feature vectors for two inputted images in the $j^{th}$ feature space, $D_i$ denotes the $i^{th}$ matcher function used to calculate a matcher score between the two feature vectors, and $W_{i,j}$ denotes a weight applied using the $i^{th}$ matcher function and the $j^{th}$ feature space.

8. A computer program product, the computer program product comprising:

one or more non-transitory computer-readable storage media and program instructions stored on the one or more non-transitory computer-readable storage media, the program instructions comprising:

program instructions for generating a multi-feature multi-matcher fusion (MMF) predictor for scoring pairs of images, and having:

program instructions for a neural network configurable to extract a set of feature spaces at different resolutions based on a training dataset; and program instruction for an optimizer that processes the training dataset, extracted feature spaces and a set of matcher functions to generate the MMF predictor having a series of weighted feature/matcher components; and program instructions for utilizing the MMF predictor to generate a prediction score indicative of a match for a pair of images.

9. The computer program product of claim 8, wherein the matcher functions are implemented using one of: cosine, chi-square, Euclidian, and correlation distance metrics.

10. The computer program product of claim 8, wherein the different resolutions for the feature spaces include sizes of 128, 256, 518 and 1024.

11. The computer program product of claim 8, wherein the weighted feature/matcher components of the MMF predictor have weights ranging between 0 and 1.

12. The computer program product of claim 8, wherein generating the prediction score is done using the neural network to generate different feature vectors corresponding to the selected feature spaces for an inputted image.

13. The computer program product of claim 12, wherein the different feature vectors along with a second set of feature vectors associated with a stored image are utilized by the MMF predictor.

14. The computer program product of claim 8, wherein the MMF predictor is of the form:

$$\text{Score} = W_{1,1}(D_1(F1_1, F2_1)) + W_{1,2}(D_1(F1_2, F2_2)) + \ldots + W_{N,n}(D_N(F1_n, F2_n)),$$

wherein (F1j, F2j) denotes values of the feature vectors for two inputted images in the jth feature space, Di denotes the ith matcher function used to calculate a matcher score between the two feature vectors, and Wi,j denotes a weight applied using the ith matcher function and the jth feature space.

15. A computerized method of implementing image recognition, comprising:

training a neural network on a training dataset;

extracting from the neural network a set of feature spaces at different resolutions;

selecting a set of matcher functions;

generating a multi-feature multi-matcher fusion (MMF) predictor having a set of feature/matcher components, wherein the MMF predictor is configured to output a score for a pair of inputted images; and calculating a weight for each of the feature/matcher components based on the training dataset, extracted feature spaces and set of matcher functions.

16. The method of claim 15, further comprising: utilizing the MMF predictor to generate a prediction score indicative of a match for a pair of inputted images.

17. The method of claim 15, further comprising:

implementing a plurality of neural networks;

training each of the plurality of neural networks; and extracting from the neural networks further feature spaces at different resolutions.

18. The method of claim 15, wherein the matcher functions are implemented using one of: cosine, chi-square, Euclidian, and correlation distance metrics.

19. The method of claim 15, wherein the weights of the MMF predictor have weights ranging between 0 and 1.

20. The method of claim 15, wherein the MMF predictor is of the form:

$$\text{Score} = W_{1,1}(D_1(F1_1, F2_1)) + W_{1,2}(D_1(F1_2, F2_2)) + \ldots + W_{N,n}(D_N(F1_n, F2_n)),$$

wherein (F1j, F2j) denotes values of the feature vectors for two inputted images in the jth feature space, Di denotes the ith matcher function used to calculate a matcher score between the two feature vectors, and Wi,j denotes a weight applied using the ith matcher function and the jth feature space.

* * * * *